Patented June 28, 1938

2,122,129

UNITED STATES PATENT OFFICE 2,122,129

DIETHYL ETHER OF TRIETHYLENE GLYCOL

Henry L. Cox, South Charleston, W. Va., assignor to Carbide and Carbon Chemicals Corporation, a corporation of New York No Drawing. Application December 24, 1935, Serial No. 56,077

4 Claims. (Cl. 260—151)

The present invention relates to the production of the diethyl ether of triethylene glycol, i. e.—ethylene glycol di-(β-ethoxyethyl) ether.

This compound possesses properties adapting it for use as a high-boiling coupling agent and solvent. It is an almost odorless, high-boiling liquid, being completely miscible with water at room temperature, but only partially miscible therewith at elevated temperatures. It is miscible with most organic solvents. It boils at 240° C. at 760 mm. of mercury absolute pressure; and has a specific gravity of 0.950 at 20°/20° C. The new compound is a very good solvent for many materials, such as nitrocellulose, and vinyl resins.

The diethyl ether of triethylene glycol,

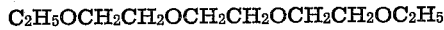

$$C_2H_5OCH_2CH_2OCH_2CH_2OCH_2CH_2OC_2H_5$$

may be prepared by heating to its boiling point and refluxing the monoethyl ether of triethylene glycol at atmospheric pressure, in the presence of small amounts of sulfuric acid, preferably not more than 2% of the weight of the last-named ether. Acid concentrations of less than 1%, and even those in the range around .003% sulfuric acid, are capable of functioning to facilitate production of the said ether. Desirably a regulated excess of ethyl alcohol or of the monoethyl ether is maintained present or is added during the resultant reaction, whereby the acidity of the mixture can be regulated. The reaction mixture then may be fractionated, and the fraction containing the diethyl ether of triethylene glycol may be washed successively with a calcium chloride brine solution, and with a 50% caustic soda solution, followed by redistillation of this washed fraction, and the separate recovery of the portion thereof boiling at 240° C. at atmospheric pressure.

The diethyl ether of triethylene glycol also may be prepared by ethylating triethylene glycol with diethyl sulfate in the presence of caustic soda; or by converting the monoethyl ether of triethylene glycol into its sodium salt, the latter of which then is reacted with ethyl chloride.

The monoethyl ether of triethylene glycol used as a starting material in one of the processes mentioned above is prepared by reacting ethyl alcohol with ethylene oxide at elevated temperatures and pressures. The reactants may be mixed together and heated in an autoclave until the reaction ceases. The pressure developed at first, upon heating gradually falls off. Reaction temperatures around 140° to 180° C. may be employed. The monoethyl ether of triethylene glycol, which has a boiling point of 248° C. at atmospheric pressure, then may be isolated by fractionation of the reaction mixture, and treated in the manner hereinbefore described.

I claim:

1. The process of producing the diethyl ether of triethylene glycol, which comprises heating the monoethyl ether of triethylene glycol in the presence of sulfuric acid in amount not substantially over around 2% by weight, fractionating the resultant reaction mixture, and isolating therefrom the fraction boiling at 240° C. at atmospheric pressure containing the diethyl ether of triethylene glycol.

2. The process of producing the diethyl ether of triethylene glycol, which comprises refluxing the monoethyl ether of triethylene glycol in the presence of an amount of sulfuric acid not substantially more than around 2% by weight, controlling the acid concentration of the reaction mixture by the regulated addition thereto of at least one member of the group consisting of the monoethyl ether of triethylene glycol and ethyl alcohol, fractionating the resultant reaction mixture, and isolating therefrom the fraction boiling at 240° C. at atmospheric pressure containing the diethyl ether of triethylene glycol.

3. The process of producing the diethyl ether of triethylene glycol, which comprises refluxing the monoethyl ether of triethylene glycol in the presence of an amount of sulfuric acid not substantially more than around 2% by weight, controlling the acid concentration of the reaction mixture by the regulated addition thereto of the monoethyl ether of triethylene glycol, fractionating the resultant reaction mixture, and separately recovering the fraction boiling at 240° C. at atmospheric pressure containing the diethyl ether of triethylene glycol.

4. The process of producing the diethyl ether of triethylene glycol, which comprises refluxing the monoethyl ether of triethylene glycol in the presence of an amount of sulfuric acid not substantially more than around 2% by weight, controlling the acid concentration of the reaction mixture by the regulated addition thereto of at least one member of the group consisting of the monoethyl ether of triethylene glycol and ethyl alcohol, and separating the diethyl ether of triethylene glycol from the resultant reaction mixture.

HENRY L. COX.